United States Patent [19]
Kao

[11] Patent Number: 5,228,796
[45] Date of Patent: Jul. 20, 1993

[54] BICYCLE SADDLE TIGHTENING DEVICE

[76] Inventor: Yu-Chien Kao, 2, Alley 1, Lane 29, Sec. 2, Pei-Shin Rd., Shin-Tian City, Taiwan

[21] Appl. No.: 868,220

[22] Filed: Apr. 14, 1992

[51] Int. Cl.$^5$ .......................... B62J 1/08; B60N 2/08; F16C 11/10; F16H 21/44
[52] U.S. Cl. ....................................... 403/84; 403/24; 74/107; 297/195; 248/231.3; 248/231.4; 248/316.2; 248/316.4
[58] Field of Search ....................... 403/87, 84, 97, 24; 297/195; 74/107, 102; 248/316.2, 316.4, 231.4, 231.3

[56] References Cited
U.S. PATENT DOCUMENTS
4,919,378 4/1990 Iwasaki et al. ................. 297/195 X Primary Examiner—Randolph A. Reese
Assistant Examiner—Christopher J. Novosad
Attorney, Agent, or Firm—Bacon & Thomas

[57] ABSTRACT

A bicycle saddle tightening device comprised of an adjusting axle, a locating cylinder, two eye bars and two locknuts, and used in securing a bicycle saddle to a seat pillar or securing a bicycle's seat pillar to a seat tube, wherein said adjusting axle has two left-sided eccentric circular blocks at two opposite ends and a right-sided eccentric circular therebetween; two eye bars include a first eye bar having two loops at one end respectively mounted on the two left-sided eccentric circular blocks and an opposite end locked by one locknut, and a second eye bar having a loop at one end mounted on the right-sided eccentric circular block and an opposite end locked by the other locknut. Rotating said adjusting axle on the locating cylinder in one direction causes the two eye bars to move toward each other into a "tightened" position; rotating the adjusting axle on the location cylinder in the other direction causes the two eye bars to move apart from each other into a "loosened" position.

4 Claims, 2 Drawing Sheets 5,228,796

BICYCLE SADDLE TIGHTENING DEVICE

BACKGROUND OF THE INVENTION (a) Field of the Invention:

The present invention relates to tightening devices, and more particularly, the present invention relates to a tightening device used in securing a bicycle saddle to a seat pillar or securing a bicycle seat pillar to a seat tube.

(b) Description of the Prior Art:

In a bicycle, two retainer plates are connected to the seat pillar by screw bolts and locknuts to hold the bicycle saddle, the seat pillar is adjustably fastened inside a seat tube at the top by a head lock ring. According to the aforesaid structure, it is not convenient to mount or dismount the bicycle saddle or to adjust the position of the seat pillar in the seat tube. Furthermore, a special hand tool shall be used in dismounting the bicycle saddle or adjusting the position of the seat pillar in the seat tube.

SUMMARY OF THE INVENTION

The present invention has been accomplished to eliminate the aforesaid disadvantages. It is therefore an object of the present invention to provide a bicycle saddle tightening device which can be used in securing a bicycle saddle to a seat pillar or securing a bicycle seat pillar to a seat tube. It is another object of the present invention to provide a bicycle saddle tightening device which can be conveniently tightened or loosened through a rotary control. According to the present invention, there is provided a bicycle saddle tightening device which is generally comprised of a locating cylinder mounted on the seat pillar or seat tube at the top, an adjusting axle revolvably fastened in a hole on the locating cylinder, two eye bars connected to the adjusting axle, and two lock means to lock the eye bars in place. The adjusting axle has two left-sided eccentric circular blocks at two opposite ends and a right-sided eccentric circular therebetween; the two eye bars include a first eye bar having two loops at one end respectively mounted on the two left-sided eccentric circular blocks, and a second eye bar having a loop at one end mounted on the right-sided eccentric circular block. Therefore, rotating the adjusting axle on the locating cylinder in one direction causes the two eye bars to move toward each other into a "tightened" position; rotating the adjusting axle on the location cylinder in the other direction causes the two eye bars to move apart from each other into a "loosened" position.

DETAILED DESCRIPTION OF THE PREFERRED EMBODIMENTS

Figure 1:
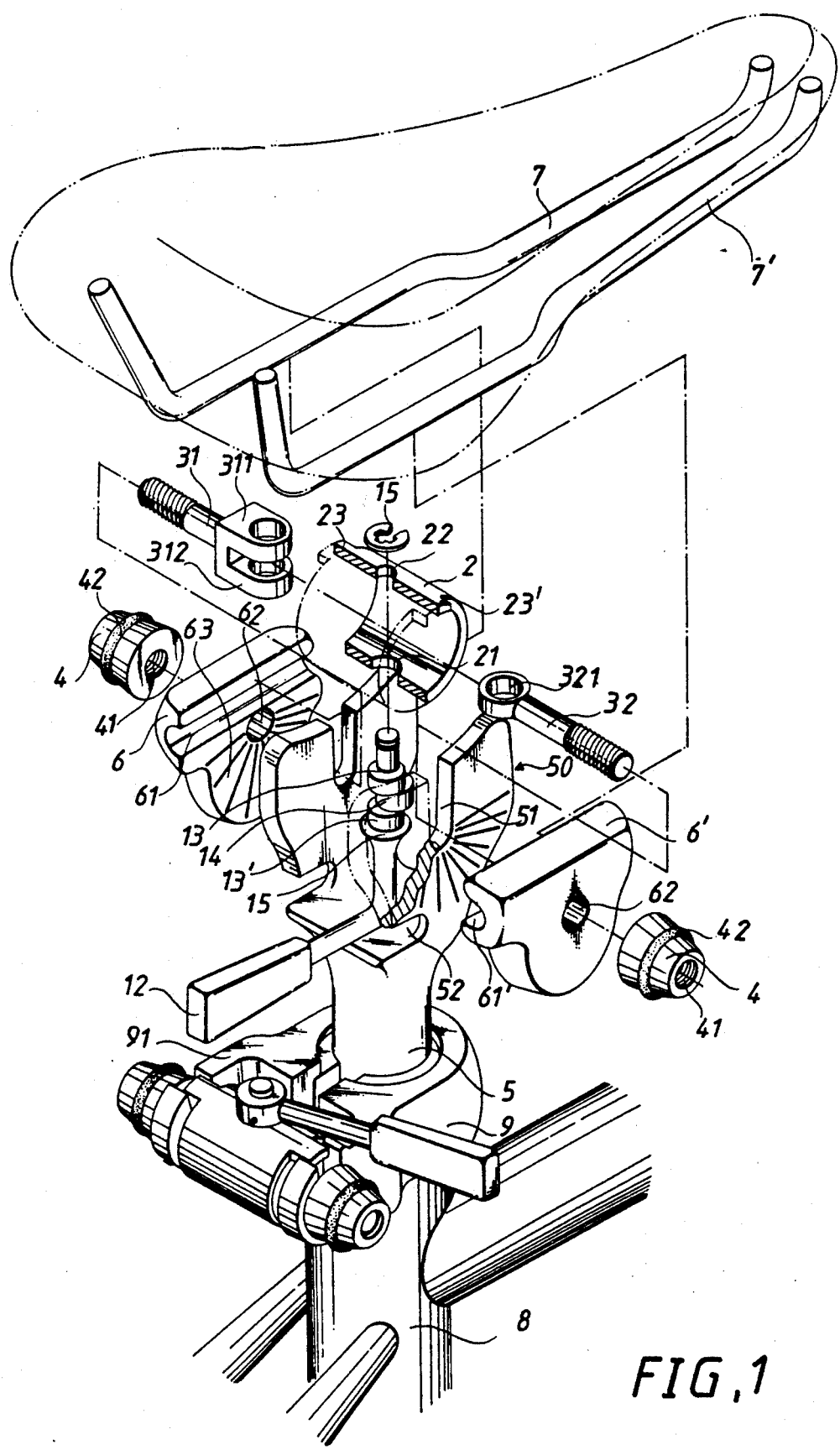
FIG. 1 is an exploded view of the preferred embodiment of the present invention.
Figure 2:
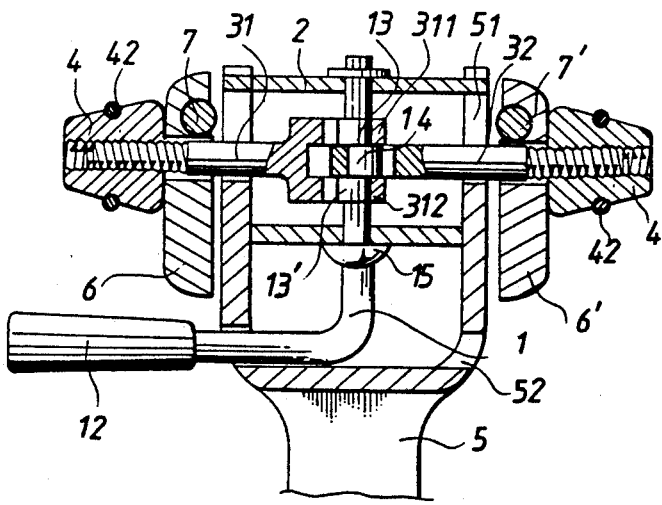
FIG. 2 is a sectional assembly view thereof when loosened.
Figure 3:
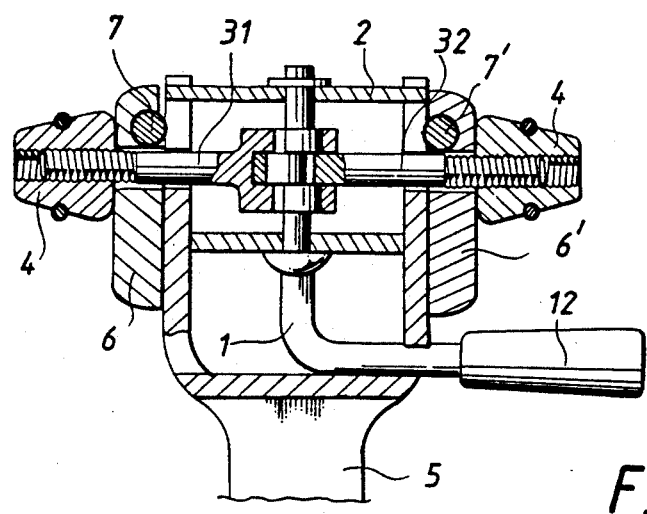
FIG. 3 is a sectional assembly view thereof when tightened.

Referring to FIG. 1, the present invention is generally comprised of an adjusting axle 1, a locating cylinder 2, a first eye screw 31, a second eye screw 32, and two locknuts 4. The adjusting axle 1 has an annular groove 11 adjacent to the top end thereof, a bottom end terminated into a lever 12 at right angle, three eccentric circular blocks 13,13',14 of the same size below the annular groove 11 with one disposed above another, wherein the top eccentric circular block 13 are the bottom eccentric circular block 13' are longitudinally aligned; the intermediate eccentric circular block 14 is disposed between the top and bottom eccentric circular blocks 13,13' at an eccentric position 180° relative to the top and bottom eccentric circular blocks 13,13'; the bottom eccentric circular block 13' has an expanded portion 15 adjacent to the axle 1. The locating cylinder 2 is made from a hollow cylinder having two through holes 21,22 on the wall thereof at two opposite locations in different diameters, and two projecting strips 23,23' longitudinally aligned at two opposite ends. The first eye screw 31 has the head thereof formed into a loop 321. The second eye screw 32 has the head thereof formed into two aligned loops, namely, an upper loop 311 and a lower loop 312. The loops 321,311,312 have the same inner diameter into which the eccentric circular blocks 13,13',14 fit respectively. The two locknuts 4 are identical, each having a bolt hole 41 through the longitudinal axis thereof respectively screwed onto the eye screws 31,32. The locknuts 4 may be respectively made in the shape of a tapered block with an anti-skid ring 42 mounted around the peripheral outside surface thereof for positive grip of the fingers.

The adjusting axle 1 is inserted through the through holes 21,22 and secured to the locating cylinder 2 by a C-shaped retainer 15. Before clamping the C-shaped retainer 15 on the annular groove 11, the eye screws 31,32 are fastened to the adjusting axle 1 with the loops 311,321,312 respectively mounted on the eccentric circular blocks 13,14,13'. The locknuts 4 are then respectively screwed onto the outer threads of the eye screws 31,32 adjacent to the rear ends thereof. Because the adjusting axle 1 has three eccentric circular blocks thereon with one disposed at 180° eccentricity relative to the others, rotating the adjusting axle 1 simultaneously causes the first and second eye screws 31,32 to move toward or apart from each other. Because the locknuts 4 are respectively screwed onto the eye screws 31,32 moving the eye screws 31,32 simultaneously causes the locknuts 4 to be carried toward or apart from each other.

The aforesaid assembly may be used in tightening a bicycle saddle. As illustrated in FIG. 1, the seat pillar 5 has the top end thereof formed into an U-shaped support 50, which has two vertical notches 51 on the two opposite side walls thereof at the top, anti-skid stripes 511 on the outside surface thereof at suitable locations, and two horizontal notches 52 on the two opposite side walls thereof at the bottom. The locating cylinder 2 is placed in the U-shaped support 50 with the two projecting strips 23,23' thereof respectively engaged into the two vertical notches 51, permitting the lever 12 to be stopped at either horizontal notch 52. Two retainer plates 6,6' are respectively mounted on the eye screws 31,32 and secured in place by the locknuts 4 to hold a bicycle saddle. The retainer plates 6,6' are identical, each having an elongated groove 61 or 61' on the inside surface thereof, and a center hole 62 or 62' through the geometric center, and anti-skid stripes 63 on the inside surface thereof. During the process of installation, the two retainer plates 6,6' are respectively mounted on the eye screws 31,32 and disposed on the outside relative to the U-shaped support 50, permitting the two frame bars 7,7' of the bicycle saddle to be respectively retained in the elongated grooves 61,61'. When set, the two locknuts 4 are respectively screwed onto the eye screws 31,32 to lock up the retainer plates 6,6' in place, and therefore the frame bars 7,7' are tightly retained between the two opposite walls of the U-shaped support 50 and the two retainer plates 6,6'. By rotating the lever 12 of the adjusting axle 1, the locknuts 4 are moved toward each other causing the frame bars 7,7' of the bicycle saddle to be firmly retained by the retainer plates 6,6', or moved apart from each other permitting the frame bars 7,7' of the bicycle saddle to be released from the retainer plates 6,6'.

Referring to FIG. 1 again, the tightening device of the present invention can also be used in tightening up the bicycle saddle seat pillar 5 in the seat tube 8. For this application, a check 9 is mounted on the seat tube 8 at the top to hold the bicycle saddle seat pillar 5 by means of the control of the tightening device of the present invention. The check 9 has two opposite ends formed into a support 91 to which the tightening device of the present invention is secured. In this arrangement, the installation and operation of the tightening device of the present invention are similar to the aforesaid application example in holding a bicycle saddle.

Figure 4:
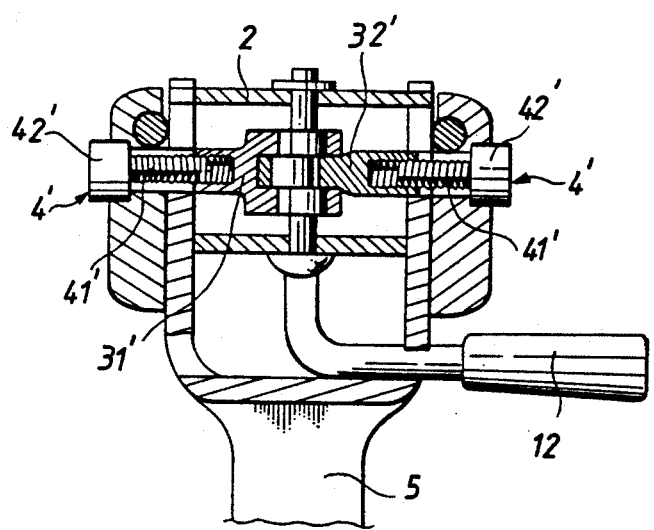
FIG. 4 is a sectional assembly view of an alternate form of the present invention.

It is apparent that various modifications could be made to the present invention without departing from the basic teachings thereof. For example, FIG. 4 illustrates an alternate form of the present invention, in which the two eye bars 31',32' and two hexagon head screws 4' are respective used in lieu of the eye screws 31,32 and the locknuts 4 in the aforesaid first embodiment of the present invention. The eye bars 31',32' have each a female thread through the longitudinal axis thereof. By screwing the outer thread 41' of each hexagon head screw 4' into the female thread of either eye bar 31',32' with the hexagon head 42' stopped against either retainer plate, the bicycle saddle is retained in place.

What is claimed is:

1. A bicycle saddle tightening device comprising:
   an adjusting axle, said adjusting axle comprised of an upper half, and a lower half at a right angle formed into a lever, said upper half having an annular groove adjacent to a top end thereof and three eccentric circular blocks with one above another, said three eccentric circular blocks including a top eccentric circular block and a bottom eccentric circular block longitudinally aligned at two opposite ends, and an intermediate eccentric circular block disposed at an eccentric position 180° relative to said top and bottom eccentric circular blocks;
   a locating cylinder, said locating cylinder having two opposite through holes vertically aligned, and two projecting strips transversely extending outwards from two opposite ends thereof and arranged in line;
   a first eye bar, said first eye bar having an expanded head at one end formed into a loop;
   a second eye bar, said second eye bar screw having an expanded head at one end formed into an upper loop and a lower loop;
   two lock means respectively mounted on said first and second eye bars for securing them in place; and wherein:
   said upper half of said adjusting axle is inserted through said through holes and retained to said locating cylinder by a C-shaped retainer with the loop of said first eye bar mounted on said intermediate eccentric circular block and, and with the upper and lower loops of said second eye bar respectively mounted on said top and bottom eccentric circular blocks, permitting said first and second eye bars to be moved toward or apart from each other by rotating said adjusting axle on said locating cylinder.

2. The bicycle saddle tightening device of claim 1, wherein said first and second eye bars each has an internally threaded boring bore; said lock means each has an outer thread respectively fitting into said internally threaded boring bore.

3. The bicycle saddle tightening device of claim 1, which is supported on an U-shaped support formed on a bicycle's seat pillar at a top to secure a bicycle saddle thereto by two retainer plates, said U-shaped support having two vertical notches on two opposite side walls thereof at the top for inserting said first and second eye bars and the two projecting strips of said locating cylinders respectively, and two horizontal notches on said two opposite side walls thereof which receive the lower half of said adjusting axle.

4. The bicycle saddle tightening device of claim 1, wherein said first and second eye bars each has an outer thread; said lock means are respectively made from a tapered nut screwed onto an outer thread of either eye bar, said tapered nut having an anti-skid ring mounted on an outside surface thereof.

* * * * *